United States Patent [19]
Guillet et al.

[11] Patent Number: 5,624,543
[45] Date of Patent: Apr. 29, 1997

[54] AQUEOUS PHASE PRODUCTION OF HYDROGEN PEROXIDE AND CATALYSTS FOR USE THEREIN

[75] Inventors: James E. Guillet, Don Mills; Kevin C. Kohler, Sherwood Park, both of Canada; Gad Friedman, Rehovot, Israel

[73] Assignee: Peroxco Incorporated, Bruderheim, Canada

[21] Appl. No.: 510,119

[22] Filed: Aug. 1, 1995

[51] Int. Cl.$^6$ .................................................. C01B 15/00
[52] U.S. Cl. ........................ 205/688; 204/157.5; 423/588
[58] Field of Search ......................... 205/688; 423/588; 204/157.5

[56] References Cited

U.S. PATENT DOCUMENTS

| | | | |
|---|---|---|---|
| 3,925,172 | 12/1975 | Voorhies | 204/72 |
| 4,046,868 | 9/1977 | Vaughan | 423/588 |
| 4,349,526 | 9/1982 | Goor et al. | 423/588 |
| 4,536,294 | 8/1985 | Guillet | 210/730 |
| 4,800,074 | 1/1989 | Bengtsson et al. | 423/588 |
| 4,803,063 | 2/1989 | Pralus | 423/588 |
| 5,296,104 | 3/1994 | Signorini et al. | 203/83 |
| 5,374,339 | 12/1994 | Guillet et al. | 204/157.5 |

FOREIGN PATENT DOCUMENTS

965678  8/1964  United Kingdom.

*Primary Examiner*—Arun S. Phasge
*Attorney, Agent, or Firm*—Ridout & Maybee

[57] ABSTRACT

Hydrogen peroxide is produced by a process which uses as catalyst a polymer which has anthraquinone/anthrahydroquinone groups attached to it, and which exhibits differential solubility in water. The polymer is water soluble under one set of conditions, e.g. temperature range, but insoluble under another set of such conditions. Accordingly, the polymer bound anthrahydroquinone groups are oxidized in aqueous solution to form anthraquinone groups and hydrogen peroxide, which dissolves in the aqueous medium. Then the conditions, e.g. temperature, are changed to precipitate the polymer, which can readily be separated off, ready for re-use.

22 Claims, 3 Drawing Sheets

$^1$H-NMR SPECTRUM OF 2-(ISOPROPENYL) ANTHRAQUINONE [200 MHz, CDCl$_3$].

FIG. 1

$^1$H-NMR SPECTRUM OF 2-(ISOPROPENYL) ANTHRAQUINONE [200 MHz, CDCl$_3$].

AQUEOUS PHASE PRODUCTION OF HYDROGEN PEROXIDE AND CATALYSTS FOR USE THEREIN

FIELD OF THE INVENTION

This invention relates to methods for manufacture of hydrogen peroxide, using novel forms of anthraquinone as catalyst. It also relates to novel anthraquinone and anthrahydroquinone polymeric complexes useful therein.

Currently, the majority of the world's hydrogen peroxide production is carried out by a process involving the chemical oxidation of small-molecule alkylanthrahydroquinone derivatives in organic solution to anthraquinone derivatives, generating hydrogen peroxide. This is followed by reduction of an alkyl anthraquinone by hydrogen, to regenerate the anthrahydroquinone for recycle. The reaction sequence is:

Hydrogen peroxide is an important industrial chemical. It is widely used as a bleach, e.g. in the pulp and paper industry. It is also used extensively in the mining industry, e.g. for removing cyanide residues from gold mining operations. It is basically an environmentally acceptable chemical, unlike many competitive industrial bleaching compounds.

The use of anthraquinone (AQ) derivatives in industrial processes for the production of hydrogen peroxide involves a number of problems relating to the efficiency, economic operation and convenience of conducting the process. A process using AQ in organic solvent solution as working solution is normally employed. The AQ derivative is hydrogenated (reduced) in this solution to anthrahydroquinone (AHQ), using a solid metal hydrogenation catalyst. The AHQ is subsequently oxygenated (oxidized), also in organic solution, to AQ, with generation of hydrogen peroxide. Problems with this known process, which detract from its economic performance, arise inter alia from the use of organic solvent.

For example, separation of the dissolved AQ from the product solution of hydrogen peroxide is complicated and costly. Liquid-liquid countercurrent extraction with water, to take out the hydrogen peroxide product as an aqueous solution, is necessary. This is costly, and involves large volumes of recycle. Quantitative separation is not achieved. An aqueous phase containing between 20% and 40% by weight hydrogen peroxide is obtained. This aqueous solution is then washed with an organic solvent to remove any co-extracted organics and concentrated by vacuum distillation to provide solutions of commercial strengths. If an organic solvent is to be used, it must have low cost, good solubilizing power for both AQ and AHQ, inertness, low water solubility and low viscosity. Work to improve this process has accordingly largely concentrated on finding better solvent systems rather than modifying the chemistry.

The anthraquinone working solution must be carefully purified before it can be recycled, and significant losses of AQ during the recovery process are inevitable. Residual hydrogen peroxide, water and side products (mainly oxidized substances such as organic acids, aldehydes and ketones) must be removed to prevent deactivation of the catalyst. This usually involves drying with a 33% (w/v) aqueous potassium carbonate solution, then treatment with a clay bed to remove the organics and water, followed by a supported nickel-silver catalyst bed to decompose hydrogen peroxide. Finally a small amount of reduced solution from the hydrogenation step has be added to assist in the final removal of hydrogen peroxide and oxygen.

Moreover, extreme precautions need to be taken in operating the process, particularly when air or oxygen is used as the oxidizing agent to generate the hydrogen peroxide. Blowing air or oxygen into solutions of organic chemicals is a dangerous operation. The dangers are increased when, as is common in hydrogen peroxide production processes using AQ as catalyst, colloidal or solid metal is used as the hydrogenation or reduction catalyst. If this catalyst becomes mixed with the reaction mixture of the oxidation stage, potentially explosive conditions may be created. The entire prior art process needs to be conducted under very carefully controlled conditions. This further adds to the expense of conducting the process, and contributes to the large investments and high operating costs of the plant.

BRIEF REFERENCE TO THE PRIOR ART

U.K. Patent 965,678 discloses a process for the production of hydrogen peroxide wherein a reducible-oxidizable polymer having an anthraquinone function is cyclically reduced and then oxidized with air in the presence of a solvent for the hydrogen peroxide. The polymers disclosed are exemplified by polyvinyl anthraquinone and polyanthraquinonyl-methylene-matonates of linear polyalcohols. The polymers are not significantly soluble in water.

U.S. Pat. No. 4,349,526 Goor discloses the use of tetrasubstituted ureas with aryl groups as solvents in the anthraquinone-based process for producing hydrogen peroxide.

U.S. Pat. No. 4,046,868 Vaughan discloses the use of carboxylic acid amide as the solvent in the manufacture of hydrogen peroxide in the anthraquinone process.

U.S. Pat. No. 4,803,063 Pralus discloses the use of carboxylic acid amides carrying aryl substituents as solvents in the anthraquinone process for producing hydrogen peroxide.

U.S. Pat. No. 4,800,074 Bengtsson describes the use of cyclic urea derivatives as the solvent for use in the anthraquinone process for the production of hydrogen peroxide.

U.S. Pat. No. 5,114,701 Suokas discloses carbamate-containing solvents for use in the anthraquinone based hydrogen peroxide production process.

It is an object of the present invention to provide a novel process for production of hydrogen peroxide, in which aqueous solvents are used instead of organic solvents.

It is a further object to provide novel forms of anthraquinone and anthrahydroquinone useful in conducting such processes, and methods for preparing such novel forms of anthraquinone and anthrahydroquinone.

SUMMARY OF THE INVENTION

This invention provides an anthraquinone (AQ) based process for the production of hydrogen peroxide, in which the anthraquinone moieties are chemically bound to a polymer which has differential solubility in water. Under one set of conditions the polymeric anthraquinone complex is soluble in water, and under another set of conditions it is insoluble in water. The quinone/hydroquinone groups, in their polymer-bound form, retain their chemical reactivity to effect the generation of hydrogen peroxide on oxidation, e.g. with air, and to undergo reduction to hydroquinone, e.g. with hydrogen.

Thus in a process for producing hydrogen peroxide according to the present invention, the polymer carrying the anthrahydroquinone groups can be dissolved in an aqueous medium, and oxidized in the aqueous solution by supplying oxygen thereto. The hydrogen peroxide so formed dissolves in the reaction medium. When all or substantially all of the hydroquinone groups have been oxidized to quinone groups so that the generation of hydrogen peroxide therefrom is effectively completed, the polymeric catalyst is rendered insoluble in the aqueous medium by changing the conditions. Then it can be readily separated from the medium, e.g. by filtration, centrifugation or the like, ready for re-use. The aqueous solution of hydrogen peroxide so formed is essentially free from catalyst residues. The prior art problems of requirements for extracting the hydrogen peroxide by immiscible liquid/liquid contact are avoided. Purification of the polymeric catalyst prior to re-use is significantly simplified.

The polymeric AQ complex is able to undergo a multitude of reaction cycles retaining its activity and efficiency for a large number of turnovers; thus it can be regarded as a true catalyst.

BRIEF REFERENCE TO THE DRAWINGS

DESCRIPTION OF THE PREFERRED EMBODIMENTS

One preferred aspect of the present invention is thus polymeric AQ compounds in which an AQ moiety, optionally derivatized or substituted, is covalently bonded to a polymer having the property of differential solubility in water. The differential solubility can be manifested in one of several ways. For example, it can be a function of temperature, where the chosen polymer is soluble in water at one temperature range but insoluble at another temperature range. In another example, the polymer may be water soluble at one pH range but insoluble at another pH range, so that change in acidity of the medium will trigger precipitation of the polymer. Other examples include solubility sensitivity to ionic content of the aqueous medium or to the presence of multivalent ions therein. Whichever criterion is used, it is preferred that the change from soluble to insoluble on the part of the polymer should take place in response to relatively small changes in conditions.

Most preferred are polymers which exhibit differential solubility in response to temperature change. Polymers which are readily soluble in water at lower temperatures but at elevated temperatures precipitate from aqueous solution are said to have a lower critical solution temperature (LCST). This solubility behavior is observed in polymeric systems where entropy plays a predominant role in determining solubility behavior. Typically, the macromolecule is stabilized by hydrogen bonding between oxygen or nitrogen centers in the polymer and water, which gradually weakens as the temperature rises. Depending on the hydrophilic/hydrophobic content of the polymers, a point is reached when the contribution to stabilization from hydrogen bonding is insufficient to keep the macromolecule in solution and the individual chains coalesce until the polymer precipitates. Polymers that display this type of temperature solubility behavior in water are known as thermosensitive, thermoresponsive or thermotropic polymers.

Examples of preferred thermotropic polymers for use as the anthraquinone group carrying polymers in the present invention are polymers and copolymers of N-(lower-alkyl) acrylamides and N-(lower-alkyl) methacrylamides, for example N-isopropylacrylamide. The homopolymer thereof, poly(NIPAM), in aqueous solution, exhibits a sharp LCST at 32° C. The precise LCST can be adjusted by incorporating co-monomers into the polymeric chain. The stability of the macromolecule in aqueous solution depends on the balance between the hydrophobic-hydrophilic content, and should be taken into account in designing the macromolecular system. Generally, incorporation of a more hydrophobic monomer lowers the LCST of the polymer while a more hydrophilic monomer raises it. Thus incorporation of acrylamide, a polar monomer, into the NIPAM copolymer, raises the LCST. In some preferred embodiments of the present invention, an additional water soluble, copolymerizable monomer such as acrylamide is added to the polymerization recipe also to enhance the water solubility of the final copolymer. Since anthraquinone is essentially insoluble in water, this can help to offset the added hydrophobicity resulting from the incorporation of the anthraquinone groups. In the alternative or in addition, water solubility can be enhanced by incorporation, in carefully controlled amounts, of polar groups into the anthraquinone moieties.

Examples of such thermotropic polymers are disclosed in U.S. Pat. No. 4,536,294 Guillet et.al., issued Aug. 20, 1985.

By proper adjustment of the co-monomer content, there can be obtained a macromolecule with an LCST in the most suitable temperature range (30°–70° C.) and one which is readily soluble in aqueous solution.

Methods of preparing anthraquinone-containing, LCST-exhibiting polymers thus include the copolymerization of a polymerizable anthraquinone (AQ) derivative with other appropriate LCST-conferring monomers. To copolymerize satisfactorily with NIPAM and the like, the anthraquinone derivative should contain side chain carbon-carbon unsaturation, e.g. in the form of a vinyl or vinylidene group, for addition copolymerization therewith. As noted above, water solubility of the anthraquinone monomer, and hence of copolymers containing it, can be enhanced by incorporation of additional electron-withdrawing, polar groups into the anthraquinone monomer. Examples of such polar groups are sulfonic acid groups and salts thereof, carboxylic acid groups and salts thereof, halogen groups and the like. The anthraquinone monomer can, of course, have other, inert substituents such as lower alkyl groups thereon, which do not interfere with the copolymerization process or the subsequent oxidation, reduction or solubilization reactions. Alkyl substituents on the anthraquinone monomers may have the effect of lowering the water solubility of the resulting copolymers, entailing the incorporation of an extra quantity water soluble monomer therein, as a compensating factor.

Thus an AQ in the form of 2-vinyl-AQ, 2-isopropenyl carboxylic acid-AQ, an AQCH=CHCOOH moiety, 2-methylanthraquinone methacrylate (AQMA) or acrylate or the like can be copolymerized with NIPAM and optionally also with acrylamide, in suitable, predetermined proportions. Polymerization can be accomplished using standard procedures such as emulsion polymerization, as generally known in the art in connection with polymerization of unsaturated amides.

Another process for making anthraquinone groupcontaining polymers useful in the process of the present invention involves initial preparation of an appropriate base polymer, of the desired molecular weight, and its subsequent reaction with anthraquinone compounds to effect chemical bonding of the anthraquinone compound to the polymer without interfering with the chemical reactivity of the quinone groups thereon. For example, a polymer of acrylic acid or acrylic acid chloride can be readily made, and subsequently reacted with an anthraquinone bearing side hydroxyl groups, which will react with some of the functional groups on the polymer. Subsequent reaction with isopropylamine and finishing of the reaction with ammonia will appropriately adjust the water solubility of the polymer, and produce a terpolymer equivalent to a copolymer of NIPAM, AQA and acrylamide.

A second, alternative preferred embodiment of the present invention involves the use of polymers carrying the anthraquinone moieties and having differential solubility responding to different pH conditions of the solution. Such polymers, in general terms, contain either acidic polar groups or basic polar groups. In the case of polymers containing acidic groups, they will be insoluble under pH conditions lower than their pKa value, since under such conditions the acid groups are protonated and hence neutral. At higher pH values, the acid groups are in the ionized state, and hence the polymer is soluble. Examples of such polymers are polymers and copolymers of methacrylic acid. In the case of polymers containing basic groups, the basic groups are neutral under basic conditions, so that the polymer is insoluble under such conditions, but under acidic conditions the groups become protonated and ionic in nature, which causes water solubility of the polymer. Examples of such polymers are those based on vinyl pyridine monomer.

A third alternative, preferred embodiment of the invention involves the use of polymers carrying the anthraquinone moieties and having differential solubility based on ionic strength of the aqueous solution. Polymers containing ionic groups can be used in such a manner. Specific examples include N-isopropylacrylamide polymers, methacrylic acid polymers and the like. Changes in ionic content to cause solubility change are accomplished by addition to the solution of multi-valent ions such as aluminum or calcium, of a nature which do not react with hydrogen peroxide. These complex with ionic groups on the AQ-carrying polymer, to form insoluble polymer complexes, which precipitate. Resolubilization of the polymers is accomplished by separating the multivalent ions from the polymer, e.g. by chelation, ionic exchange or the like.

The efficiency of the process according to the present invention in terms of the yield of hydrogen peroxide obtained per unit of polymeric catalyst, is improved by maximizing the number of AQ/AHQ groups per unit of polymer. Accordingly, it is preferred to choose a monomer combination which on polymerization will incorporate a substantial number of AQ/AHQ moieties. This however must be balanced against the water solubility of the resultant polymer, since AQ/AHQ groups confer water insolubility on the resulting polymer. It must also be balanced against the desired LCST, since as noted this is a function of the hydrophobic/hydrophilic balance between the constituents of the copolymer.

The method of reduction of the quinone groups attached to the polymer complex is not critical to the operation of the process of the invention, and can be conducted in a variety of ways. Among the alternatives are hydrogenation, photoreduction, chemical reduction and electrochemical reduction. The hydrogenation of alkyl anthrahydroquinone over noble-metal catalysts (Pd, Pt, Ni) forms a key step in the known Chemox process for hydrogen peroxide production. In the photoreduction process, photochemical abstraction of a hydrogen from an organic hydrogen donor such as isopropanol, in the presence of the quinone group-containing polymer. In such a process, the AQ polymer complex is suitably dissolved in a mixture of water and the water-miscible hydrogen donor compound, and irradiated with light of an appropriate wave-length. Such photochemical reduction processes are described in U.S. Pat. No. 5,374,339 Guillet and Friedman, issued Dec. 20, 1994, the disclosure of which is incorporated herein by reference. Anthraquinones are readily converted to anthrahydroquinones by chemical reducing agents such as sodium dithionite.

An alternative reduction process is an electrochemical reduction, in which polymeric complex is dissolved in an appropriate proton donor-containing electrolyte and then subjected to current of the appropriate voltage passing between electrodes in the solution. In cases where the process is being conducted cyclically, with distinct separation between the oxidation stage and the reduction stage, as opposed to continuously as described below, preferably the solution is deoxygenated prior to the electrolysis, e.g. by sparging with nitrogen. The progress of the electrochemical reduction, in the cyclical process, can be monitored spectroscopically, e.g. by monitoring on the UV-vis spectrum the gradual disappearance of the peak at 335 nm attributable to AQ and the development of the peak at 400 nm attributable to anthrahydroquinone.

The oxidation process, in the cyclical method of operating the present invention, can be conducted quite simply, by bubbling gaseous air or oxygen through the aqueous solution of the reduced polymeric catalyst. The AHQ groups are readily oxidized at room or slightly elevated temperatures, in the aqueous solution, to AQ groups without the need for catalysts or the like to effect the oxidation.

Whilst chemical oxidation with oxidizing agents such as permanganates and periodates can be undertaken, this is much more expensive and inconvenient, and offers no particular advantage. The hydrogen peroxide dissolves in the aqueous working solution as it is produced.

The process can, however, be conducted continuously instead of cyclically, with hydrogen peroxide being generated continuously upon prolonged electrochemical reduction of the polymer in the presence of oxygen. In this case, a stream of oxygen-containing gas may be bubbled continuously through a solution of the polymer in a suitable electrolyte, with an appropriate potential applied between a working electrode and a counter-electrode in the solution. In this process, the hydrogen peroxide concentration in the aqueous reaction medium increases over time. At approximately optimal hydrogen peroxide concentration, withdrawal of a portion of the reaction medium commences and is conducted continuously, with concurrent replacement of the withdrawn volume with fresh or recycled medium containing dissolved polymeric catalyst. The hydrogen peroxide-rich solution withdrawn is subjected to temperature change or other condition change to cause precipitation of the polymer, which is then removed. The hydrogen peroxide aqueous solution may be further concentrated and purified if desired. The extracted polymeric catalyst can be re-dissolved and returned, periodically or continuously, to the process.

The process of the invention is conducted in aqueous medium, using AQ/AHQ groups bound to water compatible polymers, so that the hydrogen peroxide evolved dissolves in the aqueous medium. Whilst normally the polymer dissolves in the aqueous medium to form a homogeneous solution, this is not necessary for successful practice of the invention. The AQ/AHQ-carrying polymer can be present in the form of microparticles suspended in the aqueous medium, e.g. as an emulsion of particles therein, and perform equally well. The change in conditions causes the polymer to form a precipitate in a form in which it can be readily separated from the aqueous medium.

Recovery of the polymeric catalyst is effected by causing precipitation thereof, which, in one preferred embodiment, is effected by raising the temperature of the aqueous reaction solution above the LCST of the polymer. Preferred polymers for use herein have an LCST in the range from about 30°–70° C., and a sharp change, taking place within about ½° C. temperature change. Precipitation can be effected with the anthraquinone groups on the polymer in their oxidized or reduced condition. Thus, when operating the process of the present invention cyclically, temperature change to cause precipitation may occur after the conclusion of a reduction step or after the conclusion of an oxidation step. It is preferred to precipitate the polymer in its oxidized condition, to avoid any losses of hydrogen peroxide from the aqueous solution thereof, as a result of supply of hydrogen or electrolysis to effect reduction. When the process is being conducted continuously, with concurrent oxidation, production of hydrogen peroxide and reduction, polymer catalyst precipitation is conducted normally when the concentration of hydrogen peroxide on the reaction solution becomes so high that the efficiency of the reaction deteriorates.

SPECIFIC DESCRIPTION OF THE MOST PREFERRED EMBODIMENTS

The following are working examples of aspects of the process of the present invention, given for illustrative purposes, and are not to be construed as limiting.

EXAMPLE 1

PREPARATION OF 2-ISPROPENYLANTHRAQUINONE (IPAQ)

2-(4'-Isopropyl benzoyl)benzoic acid. A mixture of 16 g (0.11 mol) phthalic anhydride, 30 g (0.22 mol) aluminum chloride and 12 g (0.10 mol) isopropylbenzene in 120 mL carbon disulfide was refluxed for 7 h in a water bath. The carbon sulfide was then removed by distillation. A dilute HCl solution (100 mL, 1.2N) was then added slowly to the remaining residue. The aqueous phase was decanted to yield a sticky solid. $Na_2CO_3$ aqueous solution (500 mL, 15%) was added slowly to the residue which resulted in considerable foaming. The solution was heated and the resultant solution was filtered to remove the undissolved material. The filtrate was acidified with conc. HCl to give an oily layer which was extracted with diethylether. The diethylether layer was dried with $MgSO_4$, filtered and then the diethylether was removed by rotary evaporation to yield a cream-colored solid. The product was recrystallized from a $^{33}/_{66}$ (v/v) mixture of toluene and pentane (17 g, 64%) mp 126°–127° C.

$^1$H-NMR ($CDCl_3$, 200 MHz): δ10.4–11.4 (1H, br s,—COOH), 7.2–8.1 (8H, m, Ar—H), 2.85–3.07 (1H, m, —CH ), 1.25 (6H, d, —$CH_3$).

2-Isopropylanthraquinone. Fuming sulfuric acid (25 mL, 30%) was added to 8.5 g (32 mmol) of 2-(4'isopropylbenzoyl)benzoic acid. The mixture was then heated to 95° C. for 1 h in a water bath. The resultant dark solution was poured cautiously over crushed ice to yield a beige solid which was extracted with chloroform. The chloroform layer was washed sever-al times with a dilute NaOH solution ≈10%), followed by a dilute HCl solution and finally with deionized water. The resultant yellow chloroform solution was dried with $MgSO_4$, filtered and the chloroform was removed under vacuum to yield a yellow/orange solid. The product was recrystallized from heptane to yield a yellow product. (1.00 g, 113%), mp 53–54° C.

$^1$H-NMR ($CDCl_3$, 200 MHz): 7.6–8.2 (7H,m, Ar—H), 3.0–3.2 (1H, m, Ar—H), 3.0–3.2 (1H,m,—CH ), 1.34 (6H, d,—$CH_3$).

2-(α-bromoisopropyl) anthraquinone. A mixture of 0.95 g (3.8 mmol) 2-isopropylanthraquinone, 0.81 g (4.6 mmol) N-bromosuccinimide (NBS) and 6 mg benzoyl peroxide in 7 mL $CCl_4$ was refluxed for 2 h under $N_2$ with mild stirring. After cooling to room temperature, the solution was filtered through glass wool and then the $CCl_4$ was removed under vacuum to yield a yellow liquid that solidified upon cooling. $^1$H-NMR showed the conversion to be complete and so the product was used without further purification.

$^1$H-NMR ($CDCl_3$, 200 MHz): δ7.78–8.55 (7 h, m, Ar—H), 2.28 (6H, s, $CH_3$—); refer to Appendix 1 for the $^1$H-NMR spectrum.

2-(isopropenyl) anthraquinone. A solution of 0.95 g (2.9 mmol) 2-(e-bromoisopropyl anthraquinone in 7 mL pyridine was refluxed for 1.5 h. The cooled solution was then poured into 50 mL water to yield a beige solid. The product was filtered and recrystallized form ethanol-water to yield yellow/brown needles (0.65 g, 90%), mp 126° C.

Figure 1:
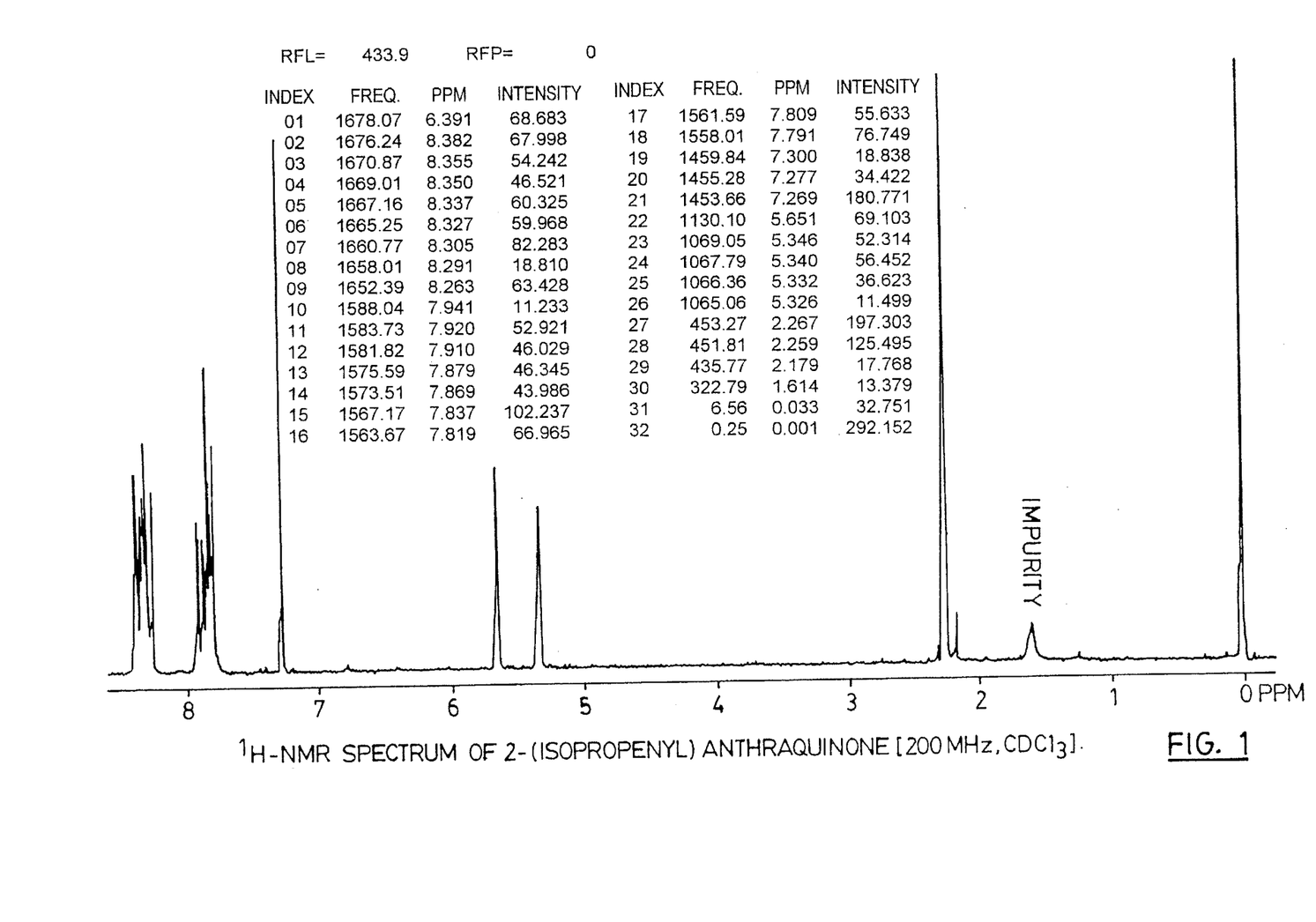
FIG. 1 is the 'H-NMR spectrum of 2-(isopropenyl)-anthraquinone (IPAQ) prepared as described in Example 1 below.

$^1$H-NMR ($CDCl_3$, 200 MHz): δ7.78–8.45 (7H, m, Ar—H), 5.65 (1H, s, $CH_2$=), 5.43 (1H, s, $CH_2$=), 2.26 (3H, s, $CH_3$—);. The $^1$H-NMR spectrum is appended hereto as FIG. 1.

EXAMPLE 2

PREPARATION OF LCST-EXHIBITING POLYMERS

N-Isopropylacrylamide (NIPAM, Kodak) was purified by recrystallization from a mixture of toluene/hexanes. Bisacrylamide (BA), potassium persulphate and 2,2'-azobis (isobutyronitrile) (AIBN) were recrystallized from methanol while sodium dodecyl sulphate (SDS) and acrylamide (ACAM) were used without further purification.

The terpolymer poly (NIPAM-ACAM-IPAQ) was prepared by free-radical polymerization according to the reagent feed summarized in Table I.

TABLE I

FEED USED IN THE PREPARATION OF Poly(NIPAM-ACAM-IPAQ)

| Reagent | Mass (mg) | Weight % | Mol % |
|---------|-----------|----------|-------|
| NIPAM   | 976       | 90.3     | 90.4  |
| ACAM    | 46.5      | 4.3      | 6.9   |
| IPAQ    | 46.5      | 4.3      | 2.0   |
| AIBN    | 12.1      | 1.1      | 0.77  |

The reagents were dissolved by adding 6 mL of methanol followed by 7 mL of toluene. The solution was poured into a polymerization ampoule, degassed by bubbling argon for 20 min, frozen to liquid nitrogen temperature and then flame sealed under vacuum. After polymerization for 48 h at 60° C. the ampoule was opened and the solution was diluted with 12 mL of diethyl ether. The polymer solution was added dropwise into a beaker containing 600 mL of diethyl ether which was being moderately stirred. The precipitated polymer was stirred for an additional 15 min and then allowed to settle. After filtration the solid was washed with 10 mL of ether and then dried overnight in a vacuum oven at 20° C. A mass of 0.57 g corresponding to a 53% yield of polymer was recovered.

Figure 2:
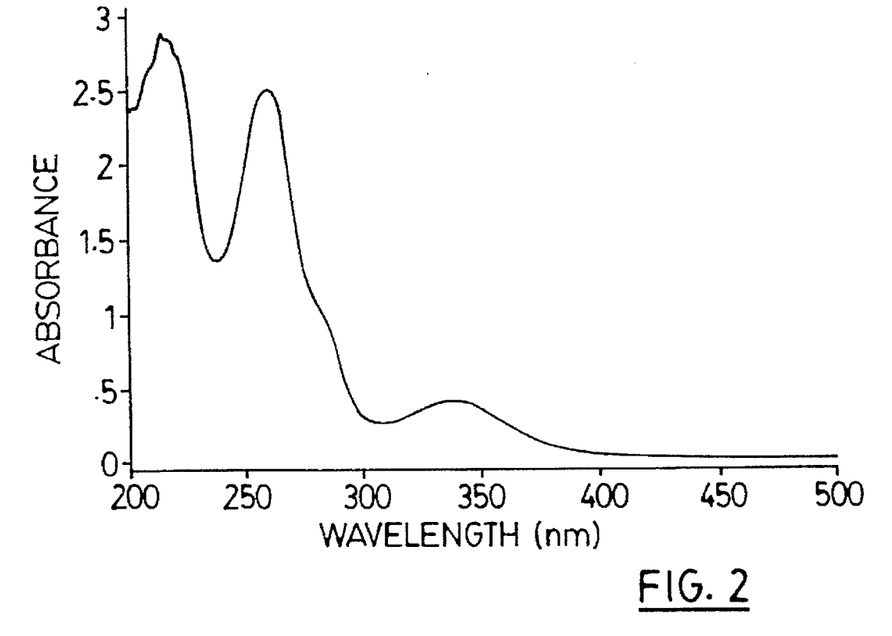
FIG. 2 is the UV spectrum, in aqueous solution, of the terpolymer described below in Example 2 hereof.

The UV spectrum, in aqueous solution, of the poly(NIPAM-ACAM-IPAQ) so formed is shown in FIG. 2 of the accompanying drawings. The bands centered at 220 and 250 nm correspond to absorption of NIPAM and to a lesser extent ACAM, while the shoulder at 280 nm and the broader band centered at 338 nm are due to absorption of the IPAQ moiety and clearly illustrate the presence of IPAQ in the terpolymer.

EXAMPLE 3

PHOTOCHEMICAL REDUCTION OF POLY (NIPAM-ACAM-IPAQ)

Figure 3:
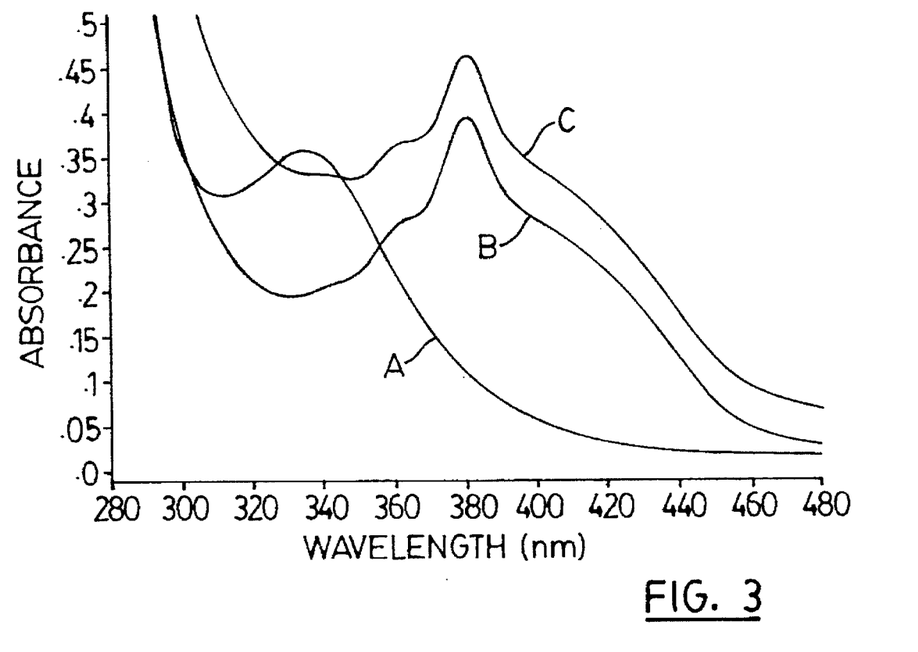
FIG. 3 is a set of UV spectra illustrating the progress of photoreduction of the terpolymer described in Example 3 hereof.

Prior to the electrochemical reduction of the pendant IPAQ groups the terpolymer was tested by photochemically reducing the IPAQ as described in equation 3, where P—indicates attachment to polymer backbone, AQ* represents anthraquinone in its excited state and RH the source of abstractable hydrogen. The photoreduction was performed in a mixture of water/isopropanol (8% w/w), and the reaction was monitored by UV spectroscopy. The resulting spectra are shown on FIG. 3 of the accompanying drawings, on which curve A is the spectrum of the initial polymer prior to irradiation (on a different scale from that of FIG. 2), curve B is the spectrum of the polymer after 90 seconds of irradiation, and curve C is the spectrum of the polymer after 3 minutes of irradiation. The UV spectra clearly show the disappearance of the anthraquinone band centered at 338 nm and growth of the hydroquinone peak at 380 nm. The isopropanol provides an easily abstractable hydrogen source required in the elementary reaction following excitation of AQ.

EXAMPLE 4

PRECIPITATION OF POLY(NIPAM-ACAM-IPAQ

The LCST or cloud point of the terpolymer was determined by slowly heating (8° C./h) the polymer solution (4.8 mg/g) and recording the temperature at which the solution first turned visibly turbid. The terpolymer had a LCST of 33±1° C., virtually the same as poly(NIPAM), indicating that the increased hydrophobicity due to insertion of IPAQ appears to be balanced by the hydrophilic ACAM. The LCLST of polymers is extremely sensitive to the hydrophilic-hydrophobic content in the polymer. Dynamic light scattering was used to determine the effective diameter from which a crude estimate of the molar mass (MW) of poly(NIPAM-ACAM-IPAQ) in aqueous solution can be made. It also provided some insight into the aggregation behavior of the terpolymer above its LCST. Based on an average effective diameter of 5 nm the MW of the terpolymer is probably in the range 10,000 to 20,000 g mol$^{-1}$. The size distribution plot of the terpolymer above its LCST shows a shift to greater diameters. This is due to the growth of the scattering centers as individual chains become entangled in the early stages of the coalescence process.

The terpolymer was precipitated by placing the polymer solution in a thermostatically controlled bath at 45° C. One sample was kept in the bath for 24 h and the clear supernatant was decanted. The other sample was kept in the bath for 2 h and the turbid solution was centrifuged. The amount of polymer remaining in the supernatant was determined by UV spectroscopy. The results are summarized in Table II.

TABLE II

SUMMMY OF PRECIPITATION EXPERIMENTS

| Method | Method of Supernatant Isolation | % Polymer Remaining in Supernatant (% w/w) |
|--------|-------------------------------|------------------------------------------|
| Terpolymer conc. 4.8 mg/g | decantation 24 h at 45° C. | 8.5 |
| Terpolymer conc. 5.4 mg/g | centrifugation 2 h at 45° C. | 5.7 |

While these precipitation experiments are crude, simple refinements in the procedure will lead to removal of virtually all of the dissolved polymer.

EXAMPLE 5

Electrochemical reduction of poly(NIPAM-ACAM-IPAQ)

Electrochemical studies of the polymer-bound anthraquinone were conducted using the terpolymer poly(NIPAM-ACAM-IPAQ). The electrolyte was 0.05M $H_2SO_4$+0.016M $Na_2SO_4$. The solution (pH 2.0) was deoxygenated by sparging with nitrogen for 15 min. The concentration of the polymer was 0.5 g/L. The electrode was a glassy carbon disk (0.07 cm$^2$) and the reference electrode was a saturated calomel electrode (SCE). Cyclic voltammetry of anthraquinone-bound polymer for a potential scan rate of 1.0 V/s produced a voltammogram which was symmetrical, indicating that the reduced anthraquinone is chemically stable over the time scale of the experiment, and that the electrochemical reduction is reversible. The pertinent parameters are $E_{1/2}$=−0.3 vs. SCE (−0.058 vs. SHE). The cathodic peak potential provides an indication of the potential required to achieve a mass transport limit. The value is 0.5 vs. SCE (−0.26 vs. NHE).

EXAMPLE 6

BULK ELECTROLYSIS OF POLY(NIPAM-ACAM-IPAQ)

The bulk electrolysis of the polymer was investigated in order to determine the extent by which anthraquinone units could be reduced, reoxidized by gaseous oxygen (producing $H_2O_2$ in the process), and finally reduced. The electrolysis cell consisted of a platinum working electrode and either a carbon rod or mercury pool complementary electrode. This solution comprised an $H_2SO_4/Na_2SO_4$ electrolyte (pH 2.0) and 2 g/L polymer. Twenty milliliters of solution was electrolyzed. The solution was deoxygenated by sparging with nitrogen for 15 min. The applied potential varied from 2 to 5 V. Gas (presumably oxygen) was produced at the anode during the reduction. Prior to analysis, the UV-vis spectrum of the solution was recorded. The characteristic absorption peak at 335 nm could be observed. Absorption spectra were taken intermittently during electrolysis. After electrolysis (3H) the solution was noticeably turbid. Spectra were obtained by taking an aliquot of the electrolyzed solution and adding water in order to bring the polymer back into solution. The absorption spectra indicated that the 335 nm anthraquinone peak had disappeared and a new broad absorption peak at 400 nm was observed which in indicative of dihydroanthraquinone. This confirmed that the $AQ+2H^+ +2e^- \rightarrow AQH_2$ reaction had taken place.

The turbid solution turned transparent when oxygen was bubbled through it for 60 min. The reaction is believed to be $AQH_2+O_2 \rightarrow AQ+H_2O_2$. In order to confirm the presence of hydrogen peroxide, an aliquot of the solution was extracted and mixed with an acidified solution of potassium iodide (0.1M KI in 2M $H_2SO_4$). The solution turned brown immediately. An absorption spectrum confirmed the presence of an absorption peak at 460 nm due to liberated iodine ($H_2O_2+2H^++I^- \rightarrow I_2+2H_2O$). As a separate confirmation, a solution of potassium permanganate in sulfuric acid was added to an aliquot of the polymer solution following electrolysis and bubbling of oxygen. The purple permanganate solution immediately turned colorless, indicating the presence of hydrogen peroxide ($2MnO_4^-+5H_2O_2+6H^+ \rightarrow 2Mn^{2+}+5O_2+8H_2O$).

The electrolyzed solution, containing the polymer-bound anthraquinone and hydrogen peroxide, was heated to 40° C. in order to precipitate the polymer. The polymer was filtered and re dissolved in fresh electrolyte. An absorption spectrum of this solution indicated 90% recovery of the anthraquinone units.

The solution was sparged with nitrogen gas in order to remove oxygen and the procedure for electrolysis and hydrogen peroxide detection was repeated as described above. Upon each electrolytic cycle the anthraquinone could be fully reduced and re-oxidized with oxygen gas. This demonstrates the cyclability of the polymer in regard to hydrogen peroxide formation.

In a second experiment, hydrogen peroxide was generated continuously upon prolonged electrochemical reduction of the polymer in the presence of oxygen. A solution of $H_2SO_4/Na_2SO_4$ electrolyte (20 mL, pH 2.0), 2 g/L polymer and 1M KI was electrolyzed. Oxygen was bubbled continuously through the solution. A potential was applied to the working electrode so that cathodic current was observed at a reasonable rate. The UV-vis absorption spectrum was monitored periodically. The absorption peak at 460 nm due to liberated iodine was observed to grow upon continued electrolysis.

EXAMPLE 7

SYNTHESIS OF 2-METHYLANTHRAQUINONE METHACRYLATE

2-Methylanthraquinone methacrylate (AQMA) was prepared by three different routes, as follows:

1(a) Methacryloyl chloride. Thionyl chloride (35 mL) was added to 15 g methacrylic acid in the presence of ca. 0.2 g cuprous chloride under $N_2$. After the gas evolution had decreased, the solution was refluxed for 2 h. The remaining thionyl chloride was removed under vacuum using a water aspirator. The product was used without any further purification.

1(b) Methacryloyl chloride (2.5 mL) was added slowly to 1.25 g (5.2 mmol) 2-(hydroxymethyl)anthraquinone in 35 mL pyridine. The solution was stirred at room temperature for 1 h and was then heated gently for a further 2 h. $H_2O$ was then added slowly and the product was extracted with chloroform. The chloroform layer was washed sever-al times with dilute HCl, followed by washing with a dilute NaOH solution with a final wash with dionized water. The chloroform layer was dried with $MgSO_4$, filtered and the chloroform was removed under vacuum to yield a yellow/ orange solid. The product, 2-methylanthraquinone methacrylate (AQMA), was recrystallized from ethanol to yield a light yellow solid (0.65 g, 41%).

Figure 4:
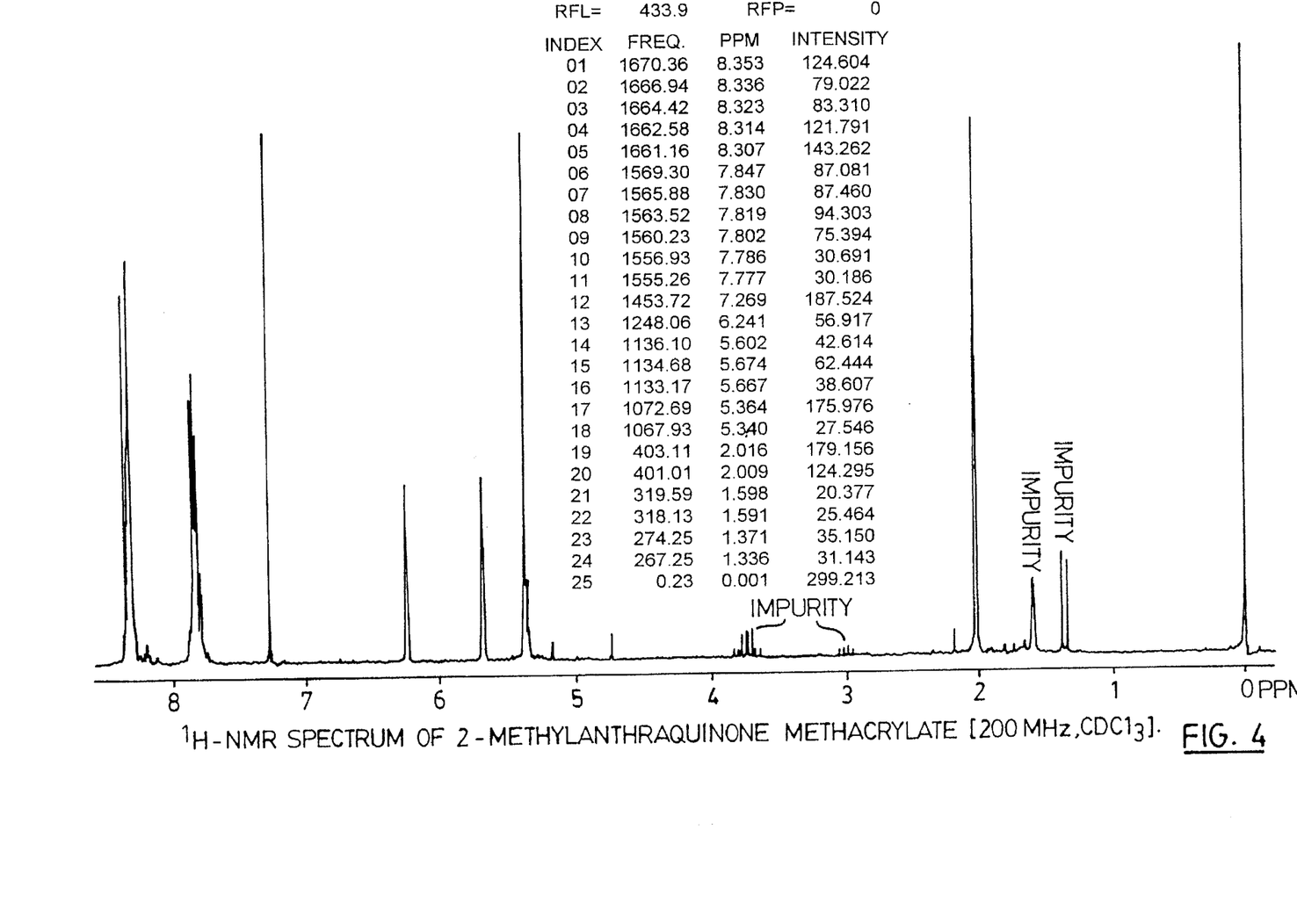
FIG. 4 is the 'H-NMR spectrum of 2-methylanthraquinone methacrylate (AQMA) prepared as described in Example 7 (1) below.

$^1$H-NMR (CDCl$_3$, 200 MHz): δ7.7–8.4 (7H, m, Ar—H), 6.2 (1H, d, CH$_2$=C), 5.6 (1H, d, CH$_2$=C), 5.36 (2H, s, Ar—CH$_2$O), 2.01 (3H, s, CH$_3$—C=). The $^1$H-NMR spectrum is appended hereto as FIG. 4.

This reaction scheme can be represented:

2. The sodium salt of methacrylic acid was prepared by adding 2.30 g NaOH, dissolved in 10 mL water, dropwise to 5 g methacrylic acid which was cooled in an ice bath. The water was removed by rotavap while keeping the temperature below 40° C. The white solid was dried in vacuo. 1.8 g 2-(Bromomethyl)-9,10-anthraquinone, 1.55 g methacrylic acid (sodium salt) and 0.1 g hydroquinone were dissolved in 50 mL DMF. The solution was heated at 60° C. for 3 h after which the solution was poured into 300 mL water to yield a cream colored solid. The solid was filtered, washed with water and dried in vacuo to yield 1.65 g product (89.7% yield.). H-NMR (CDCl3), 200 MHz) 8.2–8.4 (m, 4H, Ar—H), 7.7–7.9 (m.3H, Ar—H), 6.2 (s, 1H, CH$_2$=C—), 5.7 (s, 1H, CH2—), 5.4 (s, 2H, Ar—CH2—O), 2.0 (s, 3H, CH$_3$—C=).

3. 50 mL DMSO was added to 2.00 g 2-(bromomethyl)-9,10-anthraquinone and 1.40 mL methacrylic acid to yield a yellow suspension. 2.40 mL of 1,8-diazabicyclo[5.4.0.]undec-7-ene was added to the reaction mixture *whereupon the 2-(bromomethyl)-9-anthraquinone dissolved to yield an orange/brown solution. The reaction mixture was warmed slightly and stirred for 4 h after which the reaction mixture was added dropwise to 300 mL water to yield a creamy colored solid. The product was filtered, washed with water and dried in vacuo (1.95 g, 95.6%). The NMR showed the product to be quite pure enough for use without further purification.

EXAMPLE 8

SYNTHESIS OF POLY(NIPAM-ACAM-AOMA)

This polymer was prepared in the form of microparticles, as an emulsion of polymer particles suspended in an aqueous medium.

Emulsion polymerization was used to prepare the microparticles. Typical reagent recipes generally produce particles in the range of 0.1–1 μ. Particles in the upper size limit are produced by using a lower surfactant concentration and a greater amount of monomer.

The polymerization was performed in a 250 mL threeneck reactor fitted with a glass stirring rod with a teflon paddle, a reflux condenser on one side, and a nitrogen inlet on the other. The reactor was immersed in a water bath set at 75° C. In a typical experiment, 90 mL of Milli Q water (Millipore Corp.), 1.211 g NIPAM, 0.124 g BA, 0.108 g ACAM, 0.172 g AQMA and 0.101 g SDS were added to the reactor. The solution was stirred at 200 rpm for 30 min with a nitrogen purge to remove oxygen. The potassium persulfate KPS (0.603 g) initiator dissolved in 10 mL water was degassed by bubbling with nitrogen for 15 min. It was then added and the reaction mixture was stirred for 10 h. at 75° C. and allowed to cool to room temperature. After filtration to remove unreacted AQMA a yellowish turbid emulsion of microparticles resulted.

The monomers used in this procedure are of very different polarity, which complicates the synthesis. The emulsion of poly(NIPAM-ACAM-AQMA) had, an LCST estimated to be in the range 80°–90° C., indicating that only a fraction of the AQMA monomer was incorporated into the microparticles.

A UV spectrum of a dilute solution of this polymeric emulsion exhibited a broad bend centered at 330 nM, due to absorption of incorporated AQMA. Based on measurements of the extinction coefficient, it was determined that about 22% of the AQMA had not incorporated.

EXAMPLE 9

PHOTOCHEMICAL REDUCTION OF POLY (NIAPAM-ACAM-AQMA)

Photochemical reduction of AQMA from the poly(NIPAM-ACAM-AQMA) emulsion produced according to Example 7 was undertaken for two complete cycles. Conditions were as described in Example 3. The UV spectrum clearly illustrated the disappearance of the anthraquinone band centered at 330 nM and growth of the hydroquinone peak at 382 nM.

EXAMPLE 10

A number of polymers were prepared for further evaluation. The polymerization conditions and monomer compositions are summarized in Table III

TABLE III

| Polymer # | Starting Composition | | Conditions (Initiator, Solvent, Method) | Isolation Method | Mass |
|---|---|---|---|---|---|
| A | AQAM | 9.9% | AIBN 0.4% | dialysis, freeze dried | 0.60 g |
|   | NIPAM | 80.1% | DMF 6 mL | | |
|   | SSS | 10.0% | radical | | |
| B | AQAM | 10.1% | AIBN 0.4% | dialysis, freeze dried | 0.50 g |
|   | NIPAM | 70.1% | DMF 6 mL | | |
|   | SSS | 19.4% | radical | | |
| C | AQAM | 14.1% | AIBN 0.5% | ppted into acetone filtered, dried | 4.00 g |
|   | SSS | 89.5% | DMF 6 mL radical | | |
| D | AQAM | 6.5% | AIBN 1.2% | ppted in acetone filtered, dried | 0.95 g |
|   | MA | 93.5% | DMF 12 mL radical | | |
| E | AQAM | 7.0% | AIBN 1.4% | ppted in acetone filtered, dried | 2.00 g |
|   | SSS | 5.3% | DMF 12 mL | | |
|   | MA | 87.7% | radical | | |
| F | AQAM | 7.9% | AIBN 1.4% | ppted in H$_2$O filtered, dried | 2.00 g |
|   | 4-VP | 92.1% | DMF 12 mL radical | | |
| G | AQAM | 7.6% | ABIN 1.4% | ppted in H$_2$O filtered, dried | 0.50 g |
|   | 4-VP | 46.5% | DMF 12 mL | | |
|   | MA | 45.9% | radical | | |

In the above Table III, AQAM represents 2-methylanthraquinone methacrylate, NIPAM represents N-isopropylacrylamide, SSS represents sodium styrene sulphonate, MA represents methacrylic acid and 4-VP represents 4-vinylpyridine.

All of the above polymers except G demonstrated reversible electrochemical reduction. For example, sample C showed electrochemical reversibility, and hydrogen peroxide generation, with very clean electrochemistry. Detailed studies have shown that the reduction current efficiency is 100%. The peroxide formation efficiency was 36%. The polymer was chemically stable after exhaustive electrolysis and peroxide formation. Rates of reduction are somewhat slower than that of the corresponding molecule anthraquinone sulphonate.

Polymers A, B and C are examples of polymers having differential solubility depending on ionic content of the solution. Thus, they can be precipitated from solution quantitatively by addition of small amounts of aluminum sulfate and other salts containing positive multivalent ions. The metal ions can be removed from the catalyst by treatment with chelating agents, and reused.

Samples D and E are copolymers containing methacrylic acid (MA), and are examples of polymers having differential solubility depending on acidity (pH) of the solution.

MA has a pKa in the 4–5 range and thus at lower pH values, the acid group is protonated and in this state, the polymer is insoluble. At higher pH values, the acid groups are in the ionized state thereby inducing water solubility of the polymer. The initial solution of polymer D was soluble upon addition to water. After isolation of the polymer (precipitated into acetone and vacuum dried), it would not dissolve completely in deionized water. Neutralization of the polymer by the addition of dilute NaOH resulted in complete dissolution of the polymer. Upon acidification with HCl, the polymer precipitated. Addition of base resulted in dissolution of the polymer while subsequent acidification of the solution precipitated the polymer. Thus, the solubility of polymer D is dependent on the pH of the solution and can be reversibly precipitated and dissolved. The incorporation of SSS into the system (polymer E) resulted in the polymer being completely soluble under neutral conditions as well as under acidic conditions, but can be precipitated by the addition of dilute aluminum sulfate as in the case of A, B and C.

An example of a copolymer that is insoluble under neutral or basic conditions but soluble under acidic conditions was made using 4-vinylpyridine as the co-monomer. Under basic conditions, 4-VP is non-ionized but under acidic conditions 4-VP is protonated and thus ionic which brings about water solubility. Polymer G was insoluble upon initial addition to $H_2O$ but did dissolve under acidic conditions (pH<1). The addition of a base to this solution resulted in the precipitation of the polymer.

EXAMPLE 11

The preparation of copolymers useful in this invention can also be carried out by an alternative route, which leads to more flexibility in obtaining the desired compositions. In this procedure polymeric acid chlorides such as obtained from the polymerization of acryloyl chloride or methacryloyl chloride are reacted sequentially with anthraquinone compounds containing the required functional groups attached to an alcohol, amine, or other group capable of reacting with the acid chloride moiety. For example, polyacryloylchloride was prepared from commercial acryloyl chloride (AC) by continuous polymerization in a tubular reactor in a 10% solution of dry dioxane containing 1% benzoyl peroxide (based on monomer) at 130° C. The resulting polymer (PAC) which was substantially 100% polymerized was stored under dry nitrogen in a brown bottle equipped with a sealed syringe cap.

2-(hydroxy methyl)-0,10-anthraquinone (0.5 g) was dissolved in 20 cc dry toluene in a magnetically stirred flask sealed under nitrogen with a syringe cap. To this stirred solution was added dropwise, by syringe 20 cc of the poly (acryloyl chloride) solution prepared previously with heating by water bath to maintain the temperature near 80° C.) a 10% excess of a solution of isopropyl amine was injected to react with all the remaining acid chloride groups. The resulting solution was washed with small amounts of bicarbonate solution and water until neutral pH. The polymer was isolated from the organic phase with a rotary evaporator, then freeze-dried from benzene solution for removal of volatile impurities.

By this procedure the equivalent of a NIPAM (80%) AQA (20%) copolymer was prepared. (AQA=2-methyl anthraquinone acrylate). The reactions can be represented as follows:

This polymer is not soluble in water. However, its solubility can be improved by reducing the: amount of isopropyl amine used, and finishing the reaction with ammonia, thus giving rise to a terpolymer equivalent to a copolymer of NIPAM, AQA and ACM (acrylamide=ACM).

In a similar manner a copolymer of N-methyl methacrylamide and AQMA was prepared by reacting 2-(hydroxy methyl )-9,10-anthraquinone with an excess of poly (methacryloyl chloride) followed by treatment with a 10% excess of methyl amine.

In a similar procedure polymers useful in this invention can be obtained by reacting 1-amino anthraquinone with poly(methacrylic acid) or the corresponding acid chloride, followed by addition of another amine, or mixtures of amines such as methyl, ethyl, propyl, isopropyl, dimethyl, diethyl, dipropyl amines or ammonia. The desired solubility characteristics required for the process of the invention can be adjusted by choice of the amine components, ammonia and methyl amine siding water solubility, and isopropyl and diethyl increasing hydrophobicity.

EXAMPLE 12

OTHER METHODS OF POLYMER REDUCTION

Two anthraquinone-containing polymers and one anthraquinone model compound (1,5-anthraquinonedisulfonic acid, disodium salt) were subjected to hydrogenation, photo-reduction and chemical reduction in an aqueous environment. The structures of the polymers and the model compound are shown below. PSSS-AQMMA and PSSS-AQSS were determined to contain 18.3% AQMMA and 15.7% AQSS by weight, respectively.

[AQ-1,5-(SO$_3^-$)$_2$]

[PSS—AQSS]

[PSS—AQMMA]

(a) Hydrogenation

Hydrogenation experiments were conducted in a Parr hydrogenator, at 22° C., 3 atm H$_2$, with 10% palladium on carbon (Pd/C ) or Raney N-ickel as the catalysts. The reaction mixtures were agitated with a motor-driven shaker.

As test of the equipment and the Pd/C catalyst, the reduction of acetophenone to 1-phenylethanol was performed. The procedure used was identical to that of Freifelder[3] except that 10% Pd/C was used rather than 5% Pd/C, and proportionately less catalyst was employed. Thus, 15 g of acetophenone, 0.75 g Pd/C and 50 mL of ethanol were shaken for 2 hours under 3 atm of H$_2$. During reaction the pressure dropped by the expected 10–11 psi (0.7 atm).

The anthraquinone model compound (1,5-anthraquinonedisulfonic acid, disodium salt) and two polymers were subjected to the hydrogenation conditions. The reaction mixtures were analyzed with UV/visible spectroscopy following removal of the catalyst under an inert atmosphere (argon or nitrogen). Where anthrahydroquinone is formed, a bright yellow solution results. The results of some of the hydrogenation experiments are determined from the absorption spectra both before and after hydrogenation, and are summarized in Table 4.

TABLE 4

| Substrate | Conditions[a] | Results |
|---|---|---|
| AQ-1,5-(SO$_3^-$)$_2$. (428 mg) | Pd/C(98.7 mg), 2 hr, 100 mL 50% EtOH | ≅90% H$_2$AQ |

TABLE 4-continued

| Substrate | Conditions[a] | Results |
|---|---|---|
| PSSS-AQMMA (51 mg) | Raney Ni ($\cong$100 mg), 4 hr, 20 mL 50% EtOH | $\cong$15% $H_2AQ$ |

Less success was achieved with the polymer-Pd/C catalyst system, indicating a requirement for optimization of conditions and catalyst.

(b) Photoreduction

The model compound and the PSSS-AQMMA polymer were successfully reduced photochemically. The samples were dissolved in 50% isopropanol, degassed with argon and then irradiated (5 min) with a photo-reactor equipped with six 300 nm lamps (270–350 nm light). Following irradiation, the solutions were bubbled with oxygen (5 min) to re-oxidize the anthrahydroquinone. In Table 5, the qualitative observations are shown.

TABLE 5

OBSERVATIONS FOLLOWING PHOTOREDUCTION EXPERIMENTS

| SAMPLE | PHOTOREDUCED? | $H_2O_2$ DETECTED? |
|---|---|---|
| AQ-1,5-$SO_3^-)_2$ | yes | yes |
| PSSS-AQMMA | yes | yes |

The quinone/hydroquinone interconversions that occur with each cycle are rapid.

With each subsequent cycle, the spectral absorbance due to hydroquinone is diminished and there is an increase in the absorbance in the 300–350 nm region of the spectrum. This is likely due to the formation of oxanthrone, a tautomer of anthrahydroquinone. This side-product can be converted back to either quinone or hydroquinone. At pH 7, oxanthrone reverts very slowly to anthraquinone (in the presence of $O_2$). Reversion is much more rapid if the solution is alkaline or acidic.

In the both cases, the solution was tested for hydrogen peroxide. Addition of a titanium reagent (5.8 mL $TiCl_4$ in 184 mL 50% $H_2SO_4$) to a solution containing $H_2O_2$ leads to the formation of peroxytitanic acid which can be quantified by its absorbance at 414 nm[6]. Thus the solutions which had been photo-reduced then oxidized were tested with the titanium reagent. In both cases, the anthrahydroquinone appears to have been quantitatively converted to $H_2O_2$. These results are shown in Table 6.

TABLE 6

QUANTIFICATION OF HYDROGEN PEROXIDE PRODUCED BY PHOTOREDUCTION/OXIDATION OF ANTHRAQUINONE-CONTAINING SOLUTIONS

| SAMPLE | [AQ] (M) | $H_2O_2$ (M) EXPECTED | $H_2O_2$ (M) OBSERVED |
|---|---|---|---|
| AQ-1,5-($SO_3$)$^-$ | $5 \times 10^{-4}$ | $3 \times 10^{-4a}$ | $3.5 \times 10^{-4}$ |
| LPSSS-AQMMA | $3.1 \times 10^{-4}$ | $1.5 \times 10^{-3b}$ | $1.48 \times 10^{-3}$ |

[a]photoreduction was only carried to ca. 60% completion
[b]five photoreduction/oxidation cycles were performed.

(c) Chemical Reduction

The anthraquinone-containing polymers can also be reduced with chemical reducing agents. PSSS-AQMMA and PSSSAQSS were treated with sodium borohydride ($NaBH_4$). Thus, a 3.2 g/L solution of PSSS-AQMMA ([AQ] =$1.9\times10^{-3}$M) in 50% ethanol was reacted with an excess of $NaBH_4$ ($2\times10^{-2}$M). The anthraquinone absorbance at 320 nm disappeared rapidly and was replaced by a broad absorbance at ca. 400 nm typical of the anthraquinone. Reduction was very rapid in this case. The polymers can also be reduced with sodium bisulfite, but the reaction takes sever-al hours. Sodium dithionite ($Na_2S_2O_4$) reduces the polymers instantaneously in aqueous solutions. Other suitable chemical reducing agents will readily occur to those skilled in the art. In the case of the chemical reductants it is necessary to separate the polymer from the reductant and/or the decomposition products before the conversion to hydrogen peroxide can take place. This can be done using a two step (or two bed) reaction.

What is claimed is:

1. A process for producing hydrogen peroxide in an aqueous medium by oxidation of polymer-linked anthrahydroquinone moieties to form polymer-linked anthraquinone moieties, said polymer exhibiting differential solubility, the process comprising conducting said oxidation in aqueous reaction media conditions under which the polymer is substantially dissolved or suspended in the aqueous medium so as to generate hydrogen peroxide dissolved therein, and subsequently changing the aqueous reaction medium conditions to effect precipitation of the polymer from the aqueous medium with the hydrogen peroxide so formed remaining dissolved therein.

2. The process of claim 1 including a step of reduction of the resultant polymer-linked anthraquinone moieties to re-form polymer-linked anthrahydroquinone moieties.

3. The process of claim 2 wherein the oxidation of the anthrahydroquinone moieties to anthraquinone moieties with generation of hydrogen peroxide is conducted using a chemical oxidizing agent supplied to the aqueous reaction medium.

4. The process of claim 3 wherein the oxidizing agent is an oxygen-containing gas stream.

5. The process of claim 2 wherein the method of reduction is selected from the group consisting of hydrogenation, photoreduction, chemical reduction and electrochemical reduction.

6. The process of claim 5 wherein the reduction is photoreduction, and is conducted by photo irradiation of the polymer in aqueous medium in the presence of a water-miscible hydrogen donor.

7. The process of claim 5 wherein the reduction is chemical reduction, conducted using a chemical reducing agent.

8. The process of claim 7 wherein the chemical reducing agent is dithionite ion.

9. The process of claim 5 wherein the reduction is conducted electrochemically, by subjecting the polymer to electolysis in a proton-donating liquid electrolyte.

10. The process of claim 2 which is conducted cyclically, with an oxidation step followed by a reduction step constituting a cycle, the polymer being recovered from the hydrogen peroxide-containing aqueous reaction medium by precipitation after the completion of a plurality of said cycles.

11. The process of claim 2 wherein the oxidation step and the reduction step are conducted simultaneously, with air being supplied to the polymer solution to effect said oxidation while the aqueous solution of polymer is electrolyzed in the presence of a proton donor to effect said reduction, precipitation of the polymer from the aqueous reaction medium being effected after conclusion of the simultaneous oxidation-reduction process.

12. The process of claim 2, wherein said polymer is thermotropic, and said change in reaction conditions is a change in temperature.

13. The process of claim 12, wherein the polymer is a copolymer of an N-(lower-alkyl)acrylamide or an N-(lower-alkyl) methacrylamide, and an anthraquinone-containing monomer.

14. The process of claim 13 wherein the polymer has a lower critical solution temperature of from 30-70 degrees C.

15. The process of claim 14 wherein the polymer is an addition copolymer of a side-chain vinyl or vinylidene anthraquinone monomer, N-isopropylacrylamide and acrylamide.

16. The process of claim 2 wherein the change in reaction medium conditions to cause polymer precipitation is accomplished by changing pH of the reaction medium.

17. The process of claim 16 wherein the polymer is a copolymer of an anthraquinone group-containing monomer and methacrylic acid.

18. The process of claim 17 wherein the polymer is a copolymer of 2-methylanthraquinone methacrylate AQMA, sodium styrene sulphonate and methacrylic acid.

19. The process of claim 16 wherein the polymer contains units derived from anthraquinone methacrylate and units derived from vinyl pyridine.

20. The process of claim 2 wherein the change in reaction medium conditions to cause polymer precipitation is accomplished by changing ionic content of the reaction medium.

21. The process of claim 20 wherein the polymer is a copolymer of an anthraquinone group-containing monomer and either an N-(lower-alkyl )acrylamide or acrylic acid or methacrylic acid.

22. The process of claim 21 wherein precipitation of the copolymer is achieved by addition multivalent cations to the reaction medium containing the polymer dissolved or suspended therein.

* * * * *